June 21, 1932.  C. S. KEGERREIS ET AL  1,864,201
AIR CLEANER
Filed Oct. 2, 1926   2 Sheets-Sheet 1
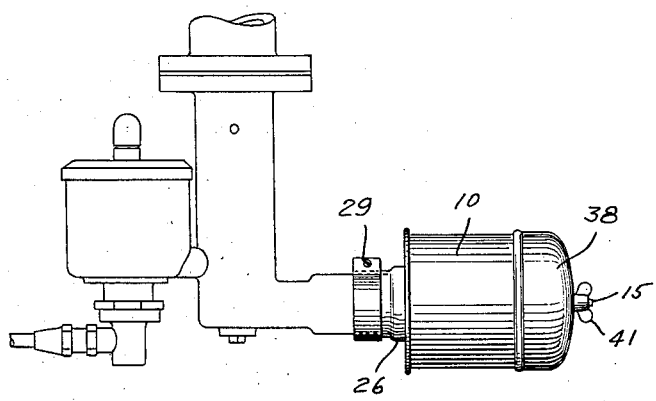
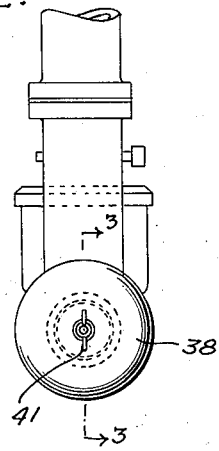
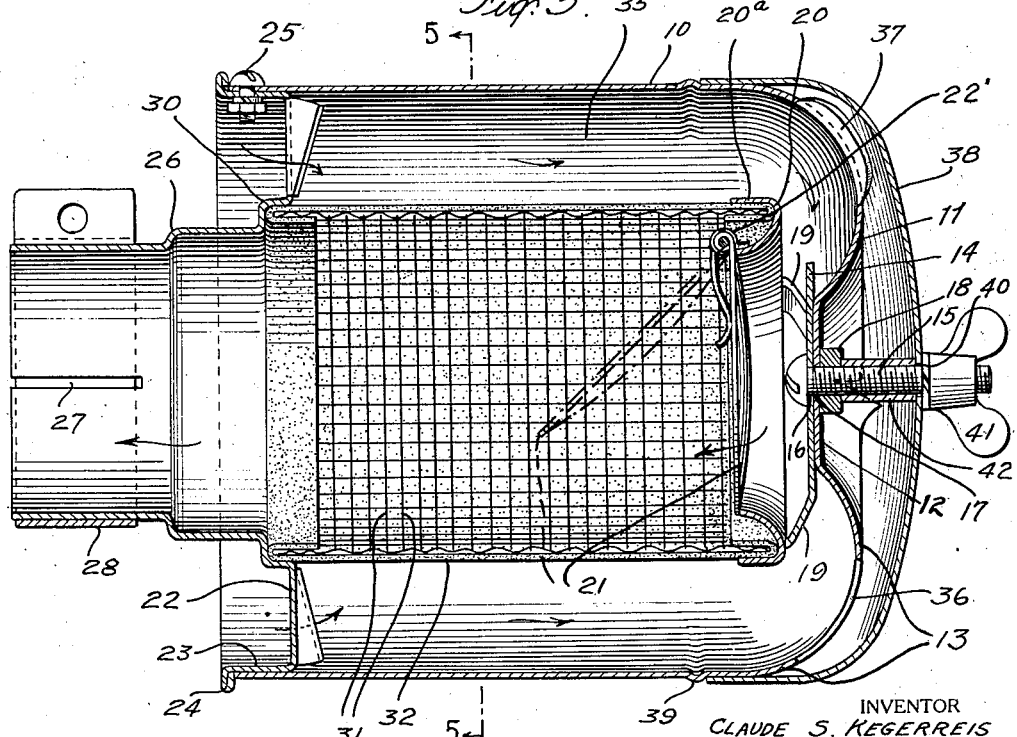
INVENTOR
CLAUDE S. KEGERREIS
JOSEPH B. LINDECKER
BY
Chester A. Braselton
ATTORNEY

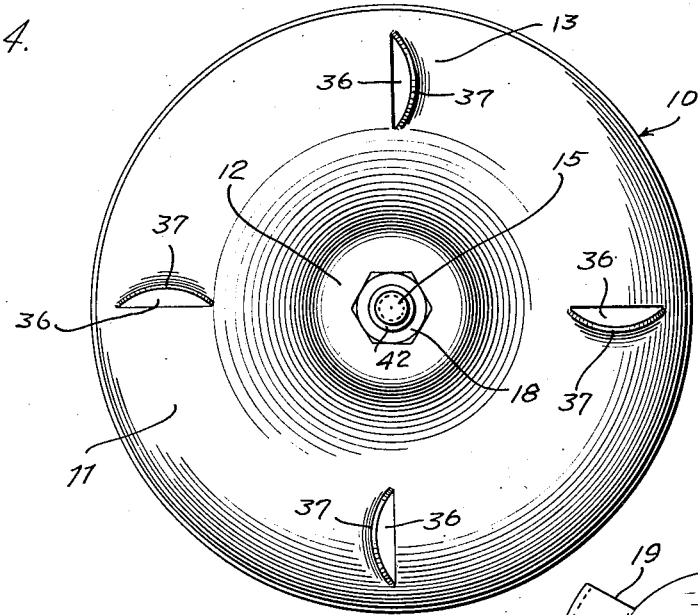
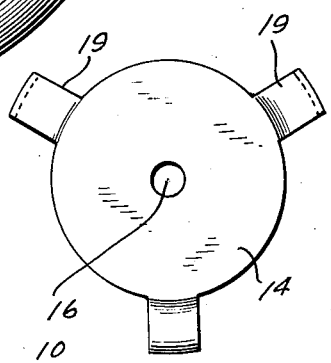
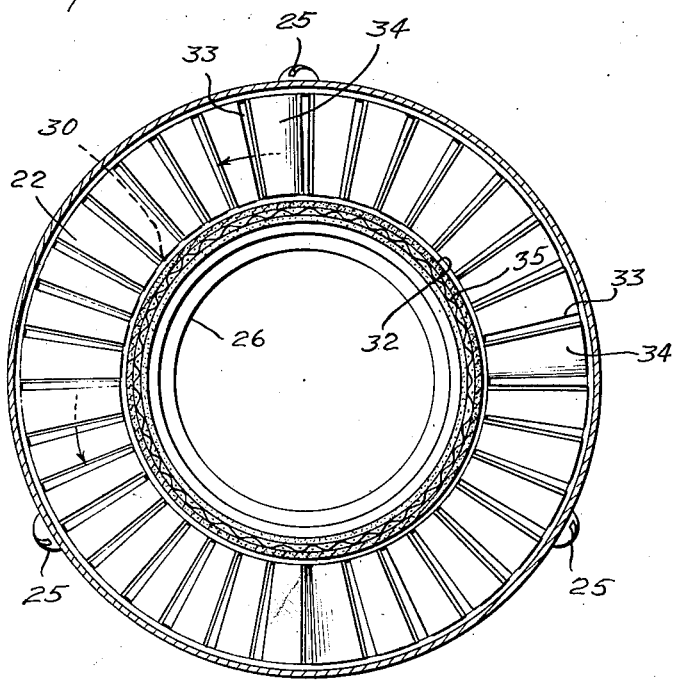
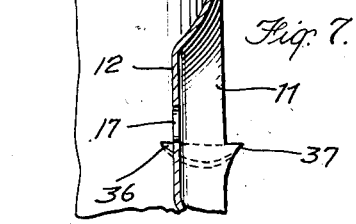

Patented June 21, 1932

1,864,201

UNITED STATES PATENT OFFICE

CLAUDE S. KEGERREIS AND JOSEPH B. LINDECKER, OF TOLEDO, OHIO, ASSIGNORS TO THE TILLOTSON MANUFACTURING COMPANY, OF TOLEDO, OHIO, A CORPORATION OF OHIO

AIR CLEANER

Application filed October 2, 1926. Serial No. 139,064.

This invention relates to air cleaners of the type adapted to be used in connection with a charge forming device for internal combustion engines.

One of the objects of the invention is to provide an air cleaner, which will thoroughly clean the air passing therethrough whether the velocity of the air be small or great.

Another object of the invention is to provide an air cleaner in which when the velocity of air is small, the air will pass through a filter, and when the velocity of the air is great, the air will pass around the filter, the dust particles being separated by centrifugal force.

Another object of the invention is to provide an air cleaner with a dust pocket, in which all of the dust separated from the air will be collected, and which may be readily removed to clean.

Another object of the invention is to provide an air cleaner in which the air is subject to little or no restriction when it is passing through the cleaner at the greatest velocity.

Another object of the invention is to provide an air cleaner which may be easily manufactured at low cost principally out of pressed metal parts, which may be easily assembled and easily dismantled for a thorough cleaning or renewing of parts.

One embodiment of the invention has been illustrated in the accompanying drawings in which like reference characters refer to like parts throughout the several views.

Fig. 1 is a side elevation of the air cleaner shown attached to the air inlet of an automobile carburetor;

Fig. 2 is an end view of the air cleaner and carburetor shown in Fig. 1;

Fig. 3 is a sectional side elevation of the air cleaner taken on line 3—3 of Fig. 2;

Fig. 4 is an end view of the air cleaner with the dust cap removed;

Fig. 5 is a sectional end view of the air cleaner taken on line 5—5 of Fig. 3;

Fig. 6 is an elevation of a baffle which constitutes part of the invention; and

Fig. 7 is a sectional elevation of a portion of the casing.

Referring now more specifically to the drawings, the embodiment of the air cleaner illustrated, comprises a casing 10 preferably cylindrical in form, and having one closed end 11 which has a central inwardly extending round portion 12. Between the inwardly extending round portion 12 and the sides of the casing 10, the end 11 is dished as at 13 to guide the air passing through the cleaner in a smooth path as will be hereinafter described. A baffle plate 14 is bolted against the inner side of the portion 12 by a bolt 15 which passes through holes 16 in the baffle 14, and 17 in the portion 12 and is secured by a nut 18. The baffle 14 has a plurality of arms 19 preferably formed integral therewith and which support in spaced relation to the baffle, a circular channel member 20. The channel member 20 forms a ring, the opening through which is normally closed by a door 21 which is resiliently held in closed position by a weak spring 22'. It will be obvious that the door 21 will be closed by any reverse flow of gases as may be caused by back firing of the engine.

The other end of the casing 10 is closed by a plate 22 having a flange 23 which fits inside the casing. The edge of the flange 23 is rolled over, forming a bead 24 which fits snugly against the end of the casing 10 and limits the distance which the plate 22 may be pushed into the casing 10, and also presents a smooth edge for the end of the casing 10. The plate 22 may be secured to the casing 10 by a plurality of bolts 25, passing through holes in the casing and in the flange 23. The central part of the plate 22 is pressed out to form a tubular member 26 which is adapted to fit over the air intake pipe of a carburetor. The tubular member may be slit as at 27 to insure the same fitting in the intake pipe of the carburetor, and may be secured upon the intake pipe by a split sleeve 28 which may be tightened upon the tubular member 26 by a bolt 29. Between the tubular member 26 and the plate 22 which is formed integral therewith is a shoulder 30 forming an annular recess, a little larger in diameter than the diameter of the tubular member 26. A filter element comprising a cylinder 31 of wire mesh covered with a filter cloth 32 is held between the channel member 20 and the grooves 30 in the tubular member 26. This filter element may be prepared by simply folding the cloth inwardly over the edges of the wire mesh cylinder, the cylinder being of such a diameter that it fits inside of the outer flange 20a of the channel member 20, and inside the shoulder 30 formed on the plate 22. The filter member is thus held firmly in place in the air cleaner and the filter cloth needs no separate means of fastening to the wire mesh.

Certain portions of the plate 22 are cut and pressed inwardly, forming a plurality of openings 33, and a plurality of vanes 34. The vanes 34 are bent with the same inclination so that air passing through the openings 33 will be given a directional twist or spiral movement in the passage 35 formed between the casing 10 and the filter cloth 32. Of course, any number of vanes 34 may be stamped in the plate 22 although only four are illustrated in the drawings.

The end 11 of the casing 10 also has a plurality of openings 36, each provided with a vane 37 bent outwardly at a uniform inclination, the inclination being in the same direction as the inclination of the vanes 34 on the plate 22. A dust cap 38 is provided, being preferably bowl shaped in form, and adapted to fit snugly over the end of the casing 10. A boss or ridge 39 may be provided in the casing 10 to limit the distance at which the dust cap 38 may be forced over the end of the casing. The dust cap 38 has a hole 40 through which the bolt 15 may pass and a wing nut 41 may be provided to secure the dust cap in place. A sleeve 42 may also be provided to be placed over the bolt 15 inside the dust cap to prevent the outer surface of the dust cap being bent inwardly.

It will thus be seen that there is provided a pocket between the portion 12 of the end 11 of the casing 10 and the dust cap, in which dust may be collected through the openings 36 in the end 11.

The operation of the air cleaner is as follows:

The suction in the intake manifold of the engine is transmitted to the interior of the air cleaner whereupon air enters through the openings 33 in the plate 22 as indicated by the arrows in Figs. 3 and 5 and is given a spiral and helical motion by the vanes 34. Under conditions where a small quantity of air only is required by the carburetor such as during idling or slow speed on a level road, the velocity of the air through the cleaner will be small and the air must therefore pass through the filter cloth 32 to find its way to the outlet which is the tubular member 26 and into the air inlet of the carburetor. At this time the door 21 is held closed by the spring 22'. When, however, the air consumption of the carburetor is increased as the engine speeds up for instance, the velocity of the air through the cleaner also increases and the pressure becomes sufficient to open the door 21 whereupon the air is free to pass through the channel member 20 into the tubular member 26 without passing through the filter. In doing this, the stream of air continuing its spiral motion given by the vanes 34 is caused to curve suddenly by the curved end 11 of the casing 10, whereupon any dust particles in the air are thrown toward the outside of the cleaner. The openings 36 in this curved portion of the end 11 are in the proper position to receive these outwardly thrown dust particles which pass through the openings and collect in the dust pocket formed by the dust cap 38. The baffle 14 extends slightly beyond the central portion 12 of the end 11 and forms a slight resistance to the smooth flow of air through the filter. This resistance at this point slightly breaks up the air stream and aids the discharge of the dust particles through the openings 36. When the velocity of the air through the cleaner becomes great enough, any dust that might have collected on the filter during the slow speed of the engine when the door 21 was closed, will be blown off from the surface of the filter cloth and will be thrown out by centrifugal force through the openings 36 into the dust pocket. Thus the filter cloth is kept clean at all times.

When it is desired to remove the dust from the dust cap 38, the wing nut 41 is removed whereupon the dust cap 38 may be withdrawn and the dust emptied out. If also for any reason the filter element needs to be removed, it is only necessary to remove the bolts 25 whereupon the whole casing 10 may be withdrawn from the flange 23 and the filter cloth and the wire mesh removed.

It will thus be seen that we have provided an air filter which is simple, constructed of few parts which are readily assembled and disassembled, and which will operate efficiently to clean the air during all conditions of engine operation.

The construction we have illustrated, however, may be considerably changed without departing from the spirit of the invention, and we do not therefore desire to limit our invention to what has been described and illustrated in the drawings, but to interpret the invention broadly within the scope of the appended claims.

Having thus described our invention what we claim and desire to secure by United States Letters Patent is:

1. In an air cleaner, a casing; a passage through said casing; means to impart a whirling motion to the air to cause dust particles to pass to one side of said passage; means to filter the air; and means to permit a portion of the air from the last mentioned side of said passage to pass unfiltered when the velocity of the air exceeds a predetermined amount.

2. In an air cleaner, a casing; an air passage in said casing; a filter adjacent said passage; means to cause dust particles in the air to pass to one side of said passage; and means to cause the air to pass through said filter when the pressure of the air in the passage falls below a predetermined amount and to permit a portion of said air to pass around said filter when the pressure of the air in the passage exceeds a predetermined amount.

3. In an air cleaner, a casing; an air passage in said casing; means to cause the air to assume a circular motion through said passage whereby dust particles are thrown to one side thereof; means to filter the air; and means to cause some of the air to pass around said filter when the pressure in said passage exceeds a predetermined amount.

4. In an air cleaner, a cylindrical casing; a cylindrical filtering element within said casing concentric therewith, and forming an air space between it and said casing; an air inlet communicating with said casing; an air outlet communicating with the interior of said filtering element; means to permit a portion of the air passing through said cleaner to pass directly from said inlet to said outlet without passing through said filtering element when the pressure in said casing rises above a predetermined amount; and said casing having means to clean the air so directly passed by centrifugal force.

5. In an air cleaner, a cylindrical casing; a cylindrical filtering element within said casing concentric therewith and forming an air passage between it and said casing; an air inlet at one end of said passage; an air outlet communicating with the interior of said filtering element; means to cause a portion of the air passing through said cleaner to pass directly from said inlet to said outlet without passing through said filter; when the pressure in said cleaner exceeds a predetermined amount; said casing having means to separate the dust particles from such portion of air by centrifugal force; and a pocket to catch such dust particles.

6. In an air cleaner, a cylindrical casing; a cylindrical filtering element shorter than said casing and considerably smaller in diameter and mounted concentrically within said casing adjacent one end thereof; an inlet for said air cleaner communicating with the space between said casing and said filtering element; an outlet communicating with the interior of said filtering element; a door normally closing the inner end of said filtering element; resilient means adapted to permit said door to open and admit a portion of the air passing through said cleaner directly to said outlet without passing through said filter when the pressure in said cleaner rises above a predetermined amount; said casing having means to separate dust particles out of said portion of air by centrifugal force.

7. In an air cleaner; a cylindrical casing; a cylindrical filtering element shorter than said casing and of considerably smaller diameter and concentrically mounted therein adjacent one end thereof; an inwardly opening door in the inner end of said filtering element; means adapted to normally hold said door closed, but to permit said door to open when the pressure of the air in said cleaner rises above a predetermined amount; and means at the end of said casing to catch dust particles.

8. In an air cleaner, a casing providing an annular air passage; a filter comprising the inner wall of said passage; means to cause the air entering said passage to follow a spiral path therethrough, said casing having an end wall with a plurality of openings therein; and a removable cap surrounding the end of said passage and forming a pocket communicating with said air passage through said openings.

9. In an air cleaner, a cylindrical casing; an annular plate adapted to be secured in one end thereof and having a plurality of openings therein; a plurality of vanes adjacent the openings in said plate and adapted to give a spiral motion to air passing through said openings; a tubular member attached to said plate and adapted to form a connection with the air inlet of the charge forming device of an internal combustion engine and to support said air cleaner thereupon; said casing having a plurality of openings therein and having an inwardly extending central portion; a disc having a larger diameter than said central portion attached thereto; a plurality of arms extending from the edge of said disc; an annular channel member supported by said arms and spaced from said disc; a cylindrical filtering element supported between said channel member and said annular plate and communicating with said tubular member; a door pivotally attached to said channel member and adapted to close the opening through said channel member; means to resiliently hold said door closed; and a cap adapted to be removably secured over the end of said casing to form a pocket to collect the dust particles thrown through the openings in said casing by centrifugal force.

10. In an air cleaner, a cylindrical casing open at one end; a tubular member extending into said casing to a point adjacent the other end, whereby an annular passage is provided between said casing and said member, the end of said casing being curved to direct air passing along said annular passage into said tubular member; a pocket adjacent the end of said casing, said casing having openings into said pocket to catch dust particles thrown out by centrifugal force; and a plate attached to the end of said casing and having its edges extending out into the air stream to aid the centrifugal separation of the dust and air.

11. In an air cleaner, means to impart a whirling motion to the air entering said cleaner, a filtering element through which the air normally passes; means to by-pass the air around said filtering element when the velocity of the air exceeds a predetermined amount and to cause said air to blow the accumulated dust from said filtering element; and means to separate dust particles from the air so by-passed.

12. In an air cleaner, a casing having an air inlet and outlet, means in said air inlet to impart a whirling motion to the air passing therethrough, an element adapted to operate as a filtering means comprising a supporting member in said casing and spaced from the walls thereof, and a layer of close woven material supported by said supporting member, a member cooperating with said filtering means, said member and said filtering means being so arranged as to restrict a reverse flow of gases through said cleaner.

In testimony whereof, we affix our signatures.

CLAUDE S. KEGERREIS.
JOSEPH B. LINDECKER.